(12) United States Patent
Kinsley, Jr.

(10) Patent No.: US 6,309,510 B1
(45) Date of Patent: Oct. 30, 2001

(54) METHOD FOR MAKING A WET-LAYED, NON-WOVEN METAL FIBER SHEET

(75) Inventor: Homan B. Kinsley, Jr., Powhatan, VA (US)

(73) Assignee: FiberMark, Inc., Brattleboro, VT (US)

( * ) Notice: Subject to any disclaimer, the term of this patent is extended or adjusted under 35 U.S.C. 154(b) by 0 days.

(21) Appl. No.: 09/366,042

(22) Filed: Aug. 2, 1999

Related U.S. Application Data

(63) Continuation of application No. 08/828,545, filed on Mar. 31, 1997, now abandoned.

(51) Int. Cl.[7] .................................................... D21H 13/48
(52) U.S. Cl. ......................... 162/141; 162/145; 162/146; 162/147
(58) Field of Search .................................. 162/141, 145, 162/146, 147, 157.1

(56) References Cited

U.S. PATENT DOCUMENTS

| | | | | |
|---|---|---|---|---|
| 2,962,415 | * | 11/1960 | Arledter | 162/145 |
| 3,127,668 | * | 4/1964 | Troy | 162/157.1 |
| 3,952,130 | * | 4/1976 | Nason | 428/332 |
| 4,265,703 | * | 5/1981 | Terliska | 162/146 |
| 4,373,992 | * | 2/1983 | Bondoc | 162/145 |
| 4,906,464 | * | 3/1990 | Yamamoto et al. | 424/78 |
| 5,290,830 | * | 3/1994 | Tung et al. | 524/36 |
| 5,472,995 | * | 12/1995 | Kaminski et al. | 523/155 |

OTHER PUBLICATIONS

Arledter, H. F. "Metal Fibers", 1964, Interscience Publisher, pp. 118–184.*

* cited by examiner

*Primary Examiner*—Dean T. Nguyen
(74) *Attorney, Agent, or Firm*—Burns, Doane, Swecker & Mathis LLP

(57) ABSTRACT

Provided by the present invention is a process for making wet-layed metal fiber nonwoven sheet. The process comprises dispersing a mixture of metal fibers, wood pulp and a fibrillated material into an aqueous dispensing fluid. The amount of metal fibers dispersed generally ranges from 60 to 80 weight percent, based on the weight of solids, with the amount of wood pulp ranging from 15 to 30 weight percent and the amount of fibrillated material ranging from about 5 to 10 weight percent. The dispersed mixture in the aqueous dispensing fluid is then applied to a screen, with the aqueous dispensing fluid being removed to thereby form a metal fiber sheet.

17 Claims, 1 Drawing Sheet

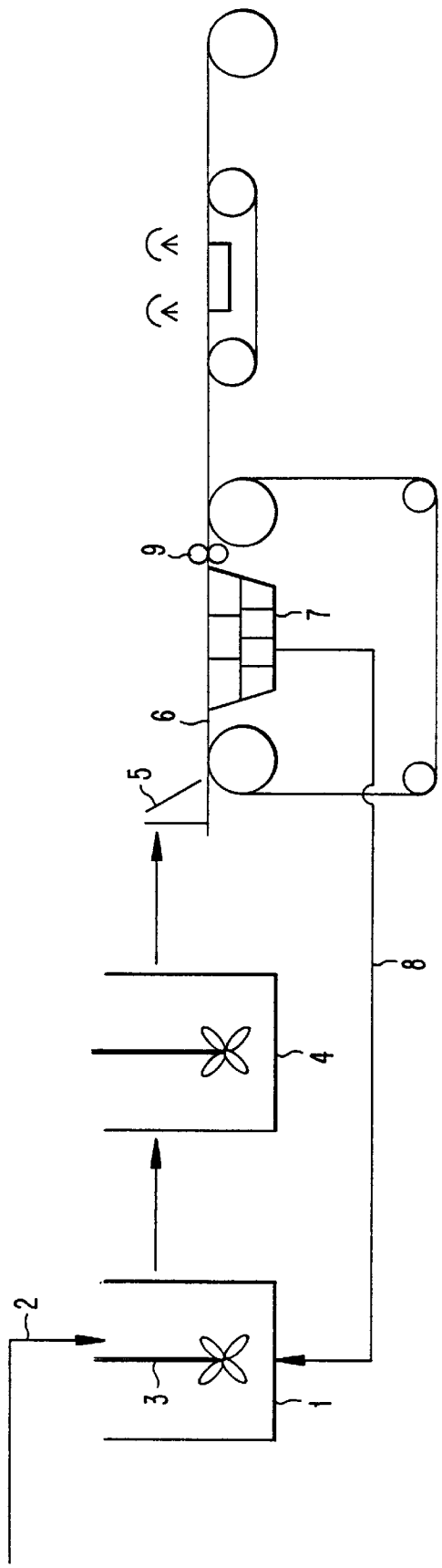

METHOD FOR MAKING A WET-LAYED, NON-WOVEN METAL FIBER SHEET

This application is a continuation, of application Ser. No. 08/828,545, filed Mar. 31, 1997 now abandoned.

BACKGROUND OF THE INVENTION

The present invention relates to a process for making a wet-layed metal fiber nonwoven sheet. In particular, the present invention relates to such a process which employs a fibrillated material in the preparation of the metal fiber sheet.

Papers comprised primarily of metal fibers have been desired by the industry for many years. Various methods have been developed for the preparation of metal fiber sheets. The manufacture of metal fiber nonwoven fabric-like paper structures on papermaking equipment has also been actively pursued due to its commercial attractiveness. Interest in such techniques is described, for example, in the chapter on metal fibers by Hanns F. Arledter in *Synthetic Fibers in Papermaking,* Editor O. Balestra, chapter 6, pages 118–184. See also U.S. Pat. No. 2,971,877.

The problem in making metal fiber sheets using conventional papermaking techniques is that the metal fibers tend to clump together. Before paper can be made, it is necessary to open fiber bundles to achieve individual fibers and to disperse the fibers uniformly in a fluid. With most wood pulps, the opening is not usually a difficult task. The pulp or source of fibers is placed in water and the mixture is sheared until the bundles open.

With metal fibers, both the opening of the bundles and the dispersion of the fibers in order to keep the fibers separated are difficult. Normal types of mixing or shearing devices can easily damage metal fibers. When metal fibers are bent, they will remain bent and eventually will interact to form balls of tangled fibers. Paper made from fibers in this form is unacceptable.

It would be of great advantage to the industry, therefore, if a process for making a metal fiber sheet using conventional papermaking techniques, i.e., a wet-laying technique, can be used. Such a process should offer efficiency and commercial viability in terms of cost.

Accordingly, it is an object of the present invention to provide a process for making a wet-layed metal fiber nonwoven sheet which is efficient and effective.

Still another object of the present invention is to provide a process for making a metal fiber nonwoven sheet using a fibrillated material.

These and other objects of the present invention will become apparent upon a review of the following specification, figure of the drawing and claims appended thereto.

SUMMARY OF THE INVENTION

Be In accordance with the foregoing objectives, provided by the present invention is a process for making a wet-layed metal fiber nonwoven sheet. The process comprises dispersing a mixture of metal fibers, wood pulp and a fibrillated material into an aqueous dispensing fluid. The amount of metal fibers dispersed generally ranges from 60 to 80 weight percent, based on the weight of solids, with the amount of wood pulp ranging from 15 to 30 weight percent and the amount of fibrillated material ranging from about 5 to 15 weight percent. The dispersed mixture in the aqueous dispensing fluid is then applied to a screen, with the aqueous dispensing fluid being removed to thereby form a metal fiber sheet.

For purposes of the present invention, the fibrillated material is defined as comprising high surface area polymer particles achieved by mechanical or biological or chemical means. Such fibrillated materials can comprise a biologically generated material such as Cellulon, or a fibrid.

Among other factors, the present invention is at least partly based upon the recognition that by using the combination of the metal fibers, wood pulp and fibrillated material, within the designated amounts, a mixture within the dispensing fluid can be created which permits the manufacture of a metal fiber sheet quite easily by conventional papermaking techniques. Upon subsequent sintering of the sheet, the organics can be burned off to provide a metal fiber sheet which comprises at least 99% by weight metal fiber.

BRIEF DESCRIPTION OF THE FIGURE OF THE DRAWING

The FIGURE of the Drawing schematically depicts the process of the present invention useful in making a metal fiber sheet by a wet-laying technique.

DETAILED DESCRIPTION OF THE PREFERRED EMBODIMENTS

The process of the present invention employs a combination of wood fibers and fibrillated material to aid in dispersing metal fibers into an aqueous dispensing fluid. The dry metal fibers are added together with the wood fibers and fibrillated material to the aqueous dispensing fluid. Through mixing, the metal fibers, wood fibers and fibrillated material are dispersed.

The metal fibers can be any useful metal fiber, with nickel and stainless steel fibers being most preferred. The stainless steel fibers can, for example, be stainless steel 304 fibers, stainless steel 16 fibers or stainless steel Hastelloy X fibers. Nickel and stainless steel fibers are most preferred because their potential uses are exceptional. The metal fibers are used in an amount ranging from about 60 to 80 weight percent, based upon the weight of solids.

The wood fibers can be any conventional wood fiber, such as softwood or hardwood fibers. Mixtures of wood fiber, including mixtures of softwood and hardwood fibers, can be used. Softwood fibers, however, are preferred. The amount of wood pulp fibers used generally ranges from about 15 to 30 weight percent.

Together with the wood pulp, a fibrillated material is used. Fibrillated materials are known in the industry, and are generally referred to as fibrids. The materials are high surface area materials of a surface area in the range of from about 5–20 $m^2/g$. This is in contrast to wood pulp, which generally has a surface area in the range of from about ½–2 $m^2/g$. The fibrillated material can be made by any conventional method, with the use of organic materials being most preferred.

It has been found that a combination of the wood pulp with the fibrillated material provide for an excellent metal fiber dispersion and the making of an excellent metal fiber sheet. Cellulon and Kevlar fibrids, both available commercially, are the most preferred fibrillated materials for use in the present invention. Another suitable material is a cellulose acetate fibrid commercially available under the mark FIBRET, available from Hoechst/Celanese Co. The amount of fibrillated material used generally ranges from 5 to 15 weight percent.

The presence of the fibrillated material has been found to be very important with regard to the present invention. The fibrillated material is generally opened up and refined by using a high sheer agitation. Colloid mills, such as the ones available from Silverson, have been found suitable. It is preferable to generate an aqueous slurry comprised of the wood pulp and the fibrillated material. The slurry is preferably generated by use of a high shear and a high energy agitator, such as the Silverson colloid mill. Alternatively, the wood pulp fibers can be added to the fibrillated material together with the metal fibers and mixed together using a non-stapling agitator as described below. Such agitators are well known.

The metal fibers are dispersed in the aqueous slurry of the high surface area material by using a non-stapling mixer, as is well understood in the industry. In general, such a mixer would have a leading surface larger in width, height and/or diameter than the length of the metal fibers. It is important to provide sufficient shear to break up the metal fiber bundles but it is equally critical to avoid bending the fibers and creating fiber aggregates. If the metal fiber aggregates are allowed to form by the application of too much mixing energy it is very difficult to re-disperse them.

Although it is possible to disperse the metal fibers in a slurry composed only of water and a high surface area material like bacterial cellulose, there are advantages to incorporating wood pulp in this slurry. We have observed that the presence of wood pulp improves the paper making characteristics like uniformity of the dispersion, the wet web strength, and the dry strength.

Conventional additives can also be added to the aqueous dispensing fluid. Such additives would include, for example, a biocide to inhibit microorganism growth in dispensing fluid. Other conventional additives can also be added.

Once the metal fibers have been dispersed in the aqueous dispensing fluid, together with the wood pulp and fibrillated material, the dispensing fluid is then applied to a screen as is conventional in papermaking process. The aqueous dispensing fluid is then removed in order to form the metal fiber sheet. Generally this is done through vacuum suction of the fluid through the screen. In a preferred embodiment, the process of the present invention is conducted in a closed system where the dispensing fluid removed from the metal fibers is recycled and reused.

Turning now to the FIGURE of the Drawing, a mixing vessel 1 contains the aqueous dispensing fluid together with any desired additives. The dry metal fiber is added via 2 into the dispensing fluid, together with the a wood pulp and fibrillated material in the desired amounts. Mixing is achieved by a mixer 3. Generally, the mixer 3 is an agitator that does not induce fiber stapling, as is known in the art. The mixing continues until the desired fiber separation is achieved.

In a preferred embodiment, the aqueous dispensing fluid containing the dispersed metal fibers is passed to a second mixing tank 4. The additional mixing is optional, but does insure good formation in the subsequent sheet. It is therefore preferred that a plurality of such mixing tanks be employed to insure good dispersion and formation of the metal sheet.

The aqueous dispensing fluid is then passed to a headbox 5, through which the aqueous dispensing fluid containing the metal fibers is applied to a continuous screen 6. A vacuum system 7 is generally used to remove the aqueous dispensing fluid in order to form the metal fiber sheet on the screen. In a preferred embodiment, the removed aqueous dispensing fluid is then recycled to the mixing tank 1 via line 8.

The formed metal fiber sheet is then passed through press rolls, and can then be calendared and dried as is conventional in the papermaking industry. The metal fiber sheet has sufficient strength to permit subsequent handling to occur without incident. This is a very important aspect of the fiber sheet, for if the sheet does not have sufficient strength to permit subsequent handling to occur, the sheet will break up and a final sintered product will not be obtained. The present invention provides a metal fiber sheet having such requisite strength.

The final step is a sintering step which can be conducted at optimum temperatures in an inert or reducing atmosphere. The sintering step introduces strength to the metal fiber paper, as well as burns off the various organics, i.e., the wood pulp and the fibrillated material, contained in the metal fiber paper. The sintering step generally involves heating the paper at a temperature of from 1500–1200° F. for a time necessary to burn off the organics. The sintering step is preferably conducted in a hydrogen atmosphere. If desired, a prior pyrolysis step can be conducted at a lower temperature to initially burn off organics. However, the pyrolysis step does not impart the necessary strength to the paper, and should be followed by the sintering step at the higher temperature of from 1500–2000° F. to burn off any remaining organics and to provide the desired strength to the paper. The resulting fiber paper contains at least about 95 weight percent metal, and most preferably about 99 weight percent.

The resulting metal fiber sheet is useful in many different applications. For example, the metal fiber sheet can be used as a battery electrode. Nickel fiber is preferred for such an application. The metal fiber sheets can also be used as fluid filters. The filters can be useful for hydraulic fluids, water or oil. The metal fiber sheets can also be used as gas filters, for example in the filtering of air or exhaust gases. The applications are many, and with the use of the present invention in the preparation of metal fiber sheets, the availability of such sheets in an economic fashion will be increased.

The invention will be illustrated in greater detail by the following specific examples. It is understood that these examples are given by way of illustration and I are not meant to limit the disclosure of the claims to a follow. All percentages in the examples, and also in the specification, are by weight unless otherwise specified.

EXAMPLE 1

In this example, a number of runs were made using nickel fiber. The formation of the handsheet was objectively observed and evaluated.

The general procedure used was to refine Cellulon (bacterial cellulose), which is a fibrillated material, in a Waring blender at high speeds for about 2 minutes. All materials to be placed in the slurry were then combined in a British disintegrator, to which was added water to make the total volume 2 liters, with the British disintegrator then being run for 5 minutes. A handsheet was then formed in an eight inch×eight inch mold. The handsheet was then dewatered, pressed and dried on a steam can. The following specific runs were made using the general procedure described above:

Run 1—4 g of 0.25 in.×10 micrometer nickel fiber were mixed with 1 g of Cellulon. The resulting handsheet had very poor formation and was quite lumpy. (By very poor formation it is meant that the sheet has an even distribution of fibers throughout.)

Run 2—4 g of the nickel fiber from Run 1, 1 g of Cellulon and 1 g of Marathon softwood fibers were mixed together to form a handsheet in accordance with the general procedure. The sheet formed had good formation, definitely much better than that of the sheet formed in Run 1.

Run 3—4 g of the nickel fiber of Run 1, ½ g of Cellulon and 2 g of the Marathon softwood fibers were mixed together and formed a handsheet in accordance with the general procedure. The sheet had very good formation, much better than that of the sheet made in Run 1.

Run 4—4 g of the nickel fiber of Run 1, ½ g of Cellulon, 2 g of the Marathon softwood fibers and 1 g of a dispersant (Chemax DFO-155) were mixed together and a handsheet formed in accordance with the general procedure. The sheet exhibited excellent formation.

Run 5—4 g of the nickel fiber of Run 1, 2 g of the Marathon softwood fibers and 1 g of the dispersant (Chemax DFO-155) were mixed together and a handsheet formed in accordance with the general procedure. No Cellulon was used in forming this handsheet. The resulting sheet did not have good formation, the sheet was quite bulky and very weak.

Run 6—The same materials as in Run 4 were added to form the handsheet except that the Marathon softwood fibers were replaced with Westvaco hardwood. The resulting sheet showed excellent formation.

From the foregoing runs, it can be seen that the combination of the metal fiber together with the fibrillated material (Cellulon) and the wood fiber forms a surprisingly excellent sheet. Using just the wood pulp or just the fibrillated material together with a metal fiber does not produce a sheet of very good formation. It is the combination of the metal fiber, wood pulp and fibrillated material in accordance with the present invention which provides a sheet worthy of commercial exposure.

EXAMPLE 2

In this example, a series of handsheets were made using varying amounts of Cellulon, Westvaco hardwood fiber, federal pine fiber and Bekaert 316 stainless steel fiber (8 micrometer diameter—6 mm long). In every instance, 6.1 wt. % DFO-155 dispersant was also added to the slurry of fibers prior to forming the handsheet.

In each run, the mixture of organic fibers were mixed together using a Silverson high shear, high energy agitator. It was found that the use of such an agitator was sufficient to open (refine) the Cellulon fibrid and the wood pulp fibers. Once the slurry had been mixed using the Silverson agitator, the metal fiber was added. The ingredients were then mixed in a 5-gallon baffled container using a non-stapling agitator. The handsheet was formed in an eight inch×eight inch mold. The handsheet was then dewatered, pressed and dried on a steam can.

Once the handsheet was made, the quality of the metal fiber paper was evaluated by viewing the paper by transmitted light after the organic fibers and fibrids were removed by pyrolysis. The pyrolysis was accomplished by heating the paper at 650° C. (1202° F.) until the organic fibers and fibrids were removed.

Sheet 1—contained 76.7 wt % stainless steel fiber, 9.6 wt % Westvaco hardwood fiber and 7.6 wt % federal pine fiber. This sheet showed poor uniformity and formation.

Sheet 2—contained 84.3 wt % stainless steel fiber and 9.6 wt % Westvaco hardwood fiber. This sheet as well indicated a paper with poor formation.

Sheet 3—contained 93.9 wt % stainless steel fiber. This sheet was the worst quality paper, as it indicated clumps of undispersed fiber.

Sheet 4—contained 84.7 wt % stainless steel fiber and 7.9 wt % Cellulon. This sheet indicated poor formation of the paper as well, equal to that of the first sheet made.

Sheet 5—contained 69.2 wt % stainless steel fiber, 9.6 wt % Westvaco hardwood fiber, 7.6 wt % federal pine fiber and 8.5 wt % Cellulon. Evaluation of the sheet formed showed a very uniform sheet, superior to all of the previously formed sheets.

Sheet 6—contained 66.2 wt % stainless steel fiber, 6.9 wt % Westvaco hardwood fiber, 7.6 wt % federal pine fiber, and 10.5 wt % Cellulon. This sheet showed very uniform and excellent paper formation.

Sheet 7—contained 64.2 wt % stainless steel fiber, 9.6 wt % Westvaco hardwood fiber, 7.6 wt % federal pine fiber, and 12.5 wt % Cellulon. This sheet showed the best paper formation of all the sheets made.

From the foregoing, it can be clearly seen that it is the combination of the wood pulp fiber, a fibrillated material (Cellulon) and the metal fiber which gives by far the best sheet formation.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for making a wet-layed, non-woven metal fiber sheet which comprises (a) dispersing a mixture of metal fibers, wood pulp and a fibrillated material into an aqueous dispensing fluid, with the mixture being dispersed by first creating a slurry of wood pulp and fibrillated material, and then adding the metal fiber to the slurry of wood pulp and fibrillated material, and with the amount of metal fibers in the mixture ranging from 60 to 80 weight percent, the amount of wood pulp in the mixture ranging from 15 to 30 weight percent and the amount of fibrillated material in the mixture ranging from about 5 to 15 weight percent;

(b) applying the aqueous dispensing fluid with dispersed mixture onto a screen, and (c) removing the aqueous dispensing fluid to thereby form a metal fiber sheet.

2. The process of claim 1, wherein the fibrillated material is comprised of bactereal cellulose or a synthetic fibrid.

3. The process of claim 2, wherein the fibrillated material comprises bactereal cellulose.

4. The process of claim 1, wherein the fibrillated material comprises a fibrid.

5. The process of claim 4, wherein the fibrid is comprised of cellulose acetate.

6. The process of claim 1, wherein the wood pulp is a mixture of hard wood and soft wood.

7. The process of claim 6, wherein the ratio of hard wood to soft wood ranges from about 40:60 to 60:40.

8. The process of claim 1, wherein the process further comprises sintering to remove organic material from the metal fiber sheet and thereby provide a metal fiber sheet comprised of at least 95% by weight metal fiber, with the remaining material being carbon residual.

9. The process of claim 8, wherein the sintering is conducted in a reducing atmosphere.

10. The process of claim 1, wherein the metal fiber is comprised of stainless steel or nickel fiber.

11. The process of claim 1, wherein the metal fiber is comprised of stainless steel fiber.

12. The process of claim 1, wherein the metal fiber is comprised of nickel fiber.

13. The process of claim 1, wherein the mixture is dispersed into the aqueous dispensing fluid by using high shear mixing.

14. The process of claim 13, wherein a colloid mixer is used to create the high shear mixing.

15. A process for making a wet-layed, non-woven metal fiber sheet which comprises (a) dispersing a mixture of metal fibers, wood pulp and a fibrillated material into an aqueous dispensing fluid, with the mixture being dispersed by first creating a slurry of the fibrillated material, and then adding the wood pulp and metal fiber to the slurry of fibrillated material, and with the amount of metal fibers in the mixture ranging from 60 to 80 weight percent, the amount of wood pulp in the mixture ranging from 15 to 30 weight percent and the amount of fibrillated material in the mixture ranging from about 5 to 15 weight percent;

(b) applying the aqueous dispensing fluid with dispersed mixture onto a screen, and (c) removing the aqueous dispensing fluid to thereby form a metal fiber sheet.

16. The process of claim 15, wherein the wood pulp, fibrillated material and metal fiber are dispersed within the aqueous dispensing fluid by using high shear agitation.

17. The process of claim 16, wherein a colloidal mill is used as the high shear agitator.

* * * * *